(12) United States Patent
Foertsch et al.

(10) Patent No.: US 11,371,928 B2
(45) Date of Patent: Jun. 28, 2022

(54) SENSOR ARRANGEMENT FOR CHARACTERISING PARTICLES

(71) Applicant: Q.ant GmbH, Stuttgart (DE)

(72) Inventors: Michael Foertsch, Stuttgart (DE); Stefan Hengesbach, Stuttgart (DE)

(73) Assignee: Q.ANT GMBH, Stuttgart (DE)

( * ) Notice: Subject to any disclaimer, the term of this patent is extended or adjusted under 35 U.S.C. 154(b) by 0 days.

(21) Appl. No.: 17/553,882

(22) Filed: Dec. 17, 2021

(65) Prior Publication Data

US 2022/0113240 A1 Apr. 14, 2022

Related U.S. Application Data

(63) Continuation of application No. PCT/EP2020/060392, filed on Apr. 14, 2020.

(30) Foreign Application Priority Data

Jun. 26, 2019 (DE) ..................... 10 2019 209 213.6

(51) Int. Cl.
*G01N 15/14* (2006.01)

(52) U.S. Cl.
CPC . *G01N 15/1434* (2013.01); *G01N 2015/1447* (2013.01); *G01N 2015/1452* (2013.01); *G01N 2015/1454* (2013.01)

(58) Field of Classification Search
CPC ....... G01N 15/1434; G01N 2015/1447; G01N 2015/1452; G01N 2015/1454

(Continued)

(56) References Cited

U.S. PATENT DOCUMENTS

| 4,854,705 A | 8/1989 | Bachalo |
| 5,455,675 A | 10/1995 | Witt et al. |

(Continued)

FOREIGN PATENT DOCUMENTS

| DE | 102011106229 B3 | 10/2012 |
| DE | 102014208630 B3 | 11/2015 |

(Continued)

OTHER PUBLICATIONS

Stamm, et al. "Strahlungsquellen für die EUV-Lithographie," *Physik Journal* 1, 12, 2002, Deutsche Physikalische Gesellschaft, Bad Honnef, Germany.

*Primary Examiner* — Roy M Punnoose
(74) *Attorney, Agent, or Firm* — Leydig, Voit & Mayer, Ltd.

(57) ABSTRACT

A sensor arrangement characterizes particles. The arrangement has an emitter with a laser source that generates a laser beam; a mode converter that generates a field distribution of the laser beam, which at each position has a different combination of a local intensity and a local polarization direction of the laser beam; and focusing optics that focus the field distribution of the laser beam onto at least one measurement region, through which the particles pass, in a focal plane. A receiver is also provided with analyzer optics configured to determine polarization-dependent intensity signals of the field distribution of the laser beam in the at least one measurement region; and an evaluator configured to characterize the particles, including the particle position, the particle velocity, the particle acceleration, or the particle size, using the polarization-dependent intensity signals.

20 Claims, 3 Drawing Sheets

(58) Field of Classification Search
USPC .......................................................... 356/336
See application file for complete search history.

(56) References Cited

U.S. PATENT DOCUMENTS

| | | | |
|---|---|---|---|
| 5,515,163 A | | 5/1996 | Kupershmidt et al. |
| 6,011,626 A | * | 1/2000 | Hielscher ............... G01N 21/21 |
| | | | 356/369 |
| 2007/0097372 A1 | | 5/2007 | Itagaki |
| 2016/0116389 A1 | | 4/2016 | Cooper et al. |
| 2016/0266316 A1 | | 9/2016 | Wohlfeil et al. |

FOREIGN PATENT DOCUMENTS

| | | |
|---|---|---|
| DE | 102017203671 A1 | 9/2018 |
| TW | 200722733 A | 6/2007 |
| TW | 201506375 A | 2/2015 |
| WO | WO 2014131910 A2 | 9/2014 |

* cited by examiner

SENSOR ARRANGEMENT FOR CHARACTERISING PARTICLES

CROSS REFERENCE TO RELATED APPLICATIONS

This application is a continuation of International Application No. PCT/EP2020/060392 (WO 2020/259889 A1), filed on Apr. 14, 2020, and claims benefit to German Patent Application No. DE 10 2019 209 213.6, filed on Jun. 26, 2019. The aforementioned applications are hereby incorporated by reference herein.

FIELD

The invention relates to a sensor arrangement for characterizing particles. The invention also relates to an optical arrangement, for example for an extreme ultraviolet (EUV) radiation generation device, having such a sensor arrangement.

BACKGROUND

The characterization of particles, or particle flows, for example the size/volume of particles, their position or trajectory and their velocity or flight direction, is of great relevance for many fields, such as the chemical, pharmaceutical or semiconductor industry. Particularly when the particles are small, i.e. in the case of particle sizes in the nanometer and micrometer range, and when the particles flow with high frequency, established sensor systems meet their limitations. If the particles are furthermore moving in liquids, characterization of particles requires very high expenditure.

SUMMARY

In an embodiment, the present disclosure provides a sensor arrangement that characterizes particles. The arrangement has an emitter with a laser source that generates a laser beam; a mode converter that generates a field distribution of the laser beam, which at each position has a different combination of a local intensity and a local polarization direction of the laser beam; and focusing optics that focus the field distribution of the laser beam onto at least one measurement region, through which the particles pass, in a focal plane. The arrangement also has a receiver with analyzer optics configured to determine polarization-dependent intensity signals of the field distribution of the laser beam in the at least one measurement region; and an evaluator configured to characterize the particles, including the particle position, the particle velocity, the particle acceleration, or the particle size, using the polarization-dependent intensity signals.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
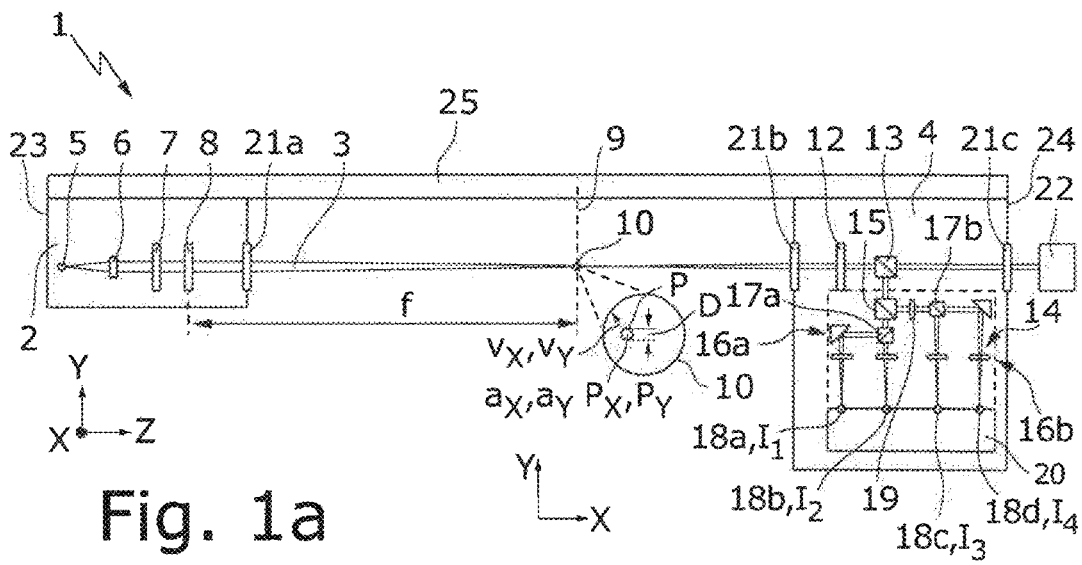
FIG. 1a shows a schematic representation of a sensor arrangement for characterizing particles which pass through a measurement region in a focal plane between an emitter and receiver.

Aspects of the present invention provide a sensor arrangement which may be used for characterizing particles in different types of media, particularly in real time. Accordingly, the present invention relates to a sensor arrangement for characterizing particles, such as for determining a particle position, a particle velocity, a particle acceleration and/or a particle size. The present invention also relates to an optical arrangement, for example for an EUV radiation generation device, having such a sensor arrangement.

An embodiment of the present invention provides a sensor arrangement comprising: an emitter having a laser source for generating a laser beam, a mode conversion device (mode converter) for generating a field distribution of the laser beam, which at each position has a different combination of a local intensity and a local polarization direction, focusing optics for focusing, or imaging, the field distribution of the laser beam onto at least one measurement region, through which the particles pass, in a focal plane, a receiver having analyzer optics for determining polarization-dependent intensity signals of the field distribution of the laser beam in the at least one measurement region, and having an evaluation device for characterizing the particles, in particular for determining the particle position, the particle velocity, the particle acceleration and/or the particle size, with the aid of the polarization-dependent intensity signals, in particular with the aid of a time evolution of the intensity signals.

The sensor arrangement described here is based on the generation of a field distribution, or of optical modes, which have a unique correlation between the local intensity distribution and the local polarization direction. A particle which moves through the measurement region in the form of such an optical mode induces a time variation both of the intensity and of the polarization of the field distribution. By the unique assignability of a respective polarization/intensity combination to precisely one subregion, or to precisely one position of the optical mode, it is possible to determine the (instantaneous) particle position and, with the aid of the time evolution of the intensity signals, also the time evolution of the particle, i.e. the particle trajectory, i.e. the evaluation device is configured to calculate back to the spatial coordinates, or the trajectory. With the aid of the time evolution of the intensity signals, it is also possible to determine the (instantaneous) particle velocity, or the time evolution thereof. The particle size, or the time evolution thereof, may likewise be determined. In the context of this application, the particle size is intended to mean the cross-sectional area of a particle in the focal plane. With the sensor arrangement, the characterization of the particles may be carried out with a high speed in the gigahertz range, i.e. the detection or the characterization of the particles may be carried out in real time.

The emitter comprises both the laser source and the mode conversion device. In principle, any type of laser is suitable as the laser source. For example, a laser diode having a laser wavelength of 1550 nm and an optical power of 100 mW may be used as the laser source. Such a laser source may, without restriction to the basic principle of the sensor arrangement, be replaced with a laser having a different laser wavelength. The sensor arrangement, or the measurement method used, may therefore be implemented with any available laser wavelength and combinations of a plurality of laser wavelengths, even outside the visible spectrum. The sensor arrangement for characterizing particles may therefore be used in a multiplicity of different media (gaseous, liquid or solid). The transverse mode profile of the laser beam generated by the laser source is generally transverse electromagnetic $(TEM)_{00}$, although the laser source may optionally also generate a different mode profile.

The laser beam may be focused in the emitter by means of focusing optics which comprise at least one focusing optical element, for example in the form of a lens, into the focal plane, the field distribution generated by the mode conversion device being imaged into the focal plane. The laser beam may be collimated by the focusing optics and optionally broadened by a telescope, in order to adapt the beam cross section to the mode conversion device following in the beam path, so that this device is illuminated optimally. The focal length of the focusing optical element is adapted, or optionally adaptable, to a desired sufficiently large working distance between the emitter and the particle flow, or the particles to be characterized. The measurement region in the focal plane forms a kind of "virtual sensor surface", which allows remote characterization of the particles without having to position the sensor in the focal plane, or at the position of the particles. The focusing optics may comprise a retrofocus objective. The focusing optics may also comprise zoom optics for adjusting the focal size in the focal plane.

In one embodiment, the mode conversion device is configured to generate a field distribution of the laser beam having a radially symmetrical polarization direction or to generate a field distribution having a linearly constant polarization direction. As described above, the particle sensor is based on the inherent entanglement of the optical transverse and optical polarization modes of the field distribution, or of the transverse beam profile (i.e. perpendicularly to the propagation direction of the laser beam). The mode conversion element is configured (a) to impose an additional transverse phase on the laser beam and (b) to locally modify the polarization of the laser beam as a function of position. During the focusing, this gives rise in the focal plane to an electromagnetic field distribution in which each combination of (a) amplitude/intensity and (b) direction of polarization vector (corresponding to the polarization direction) exists only at one uniquely determined transverse position of the beam profile. One example of such a field distribution is a radial polarization, i.e. a radially symmetrical polarization distribution, which is described by the superposition of a TEM01 and a TEM10 mode. A further example is a field distribution which has a radial polarization and in which the intensity increases continuously in one direction. In this way, each point on a line has a different intensity, so that the combination of intensity and polarization direction can be assigned uniquely to one point. Points on different lines have a different polarization direction and may therefore likewise be distinguished from one another.

In another embodiment, the mode conversion device is configured as an (optionally segmented) phase plate, as a diffractive optical element, as a photonic crystal fiber or as a liquid crystal. In principle, it is possible to carry out the imposition of the transverse phase and the local modification of the polarization at different optical elements. In general, however, it is favorable to carry out the modification both of the phase and of the polarization at the same optical element, which is for example made possible by the types of optical elements described above.

In another embodiment, the laser source is configured to generate a pulsed laser beam, preferably with a pulse duration of less than 1 ns. In principle, the laser source may be configured to generate continuous-wave radiation (cw radiation). In the embodiment described here, the laser source is a pulsed laser source, or a pulsed laser system, for example an ultrashort-pulse laser, with which laser pulses having pulse durations in the picosecond range can be generated. The pulsed laser beam may be used to enlarge the measurement region, or the virtual sensor surface, in the focal plane, as will be described in more detail below. It is to be understood that it is also possible to use a laser source which can be switched between an operating mode with continuous-wave radiation and an operating mode with pulsed laser radiation.

In another embodiment, the emitter comprises a beam splitter device, arranged after the mode conversion device in the beam path, for splitting the laser beam into a multiplicity of partial beams having the field distribution generated by the mode conversion device, and the focusing optics are configured to focus the multiplicity of partial beams into a multiplicity of measurement regions in the focal plane. Preferably, the receiver comprises an (optical) retardation device for retarding the multiplicity of partial beams respectively with a different retardation time. In this case, the virtual sensor surface in the focal plane is enlarged by a multiplicity of measurement regions being generated spatially next to one another.

To this end, by means of a beam splitter device, the laser beam is split into a desired multiplicity of partial beams which respectively have the same field distribution generated by the mode conversion device. The focusing optics focus the partial beams onto a multiplicity of measurement regions in the focal plane, generally in a regular arrangement, i.e. in a grid or array having a number N×M of measurement regions, which are arranged in N rows and in M columns. To this end, the focusing optics may for example comprise a multiplicity of focusing lenses, or one or more lens arrays.

It is possible to provide a number N×M of partial beams corresponding to the number of analyzer optics, or of receivers, in the sensor arrangement. In this case, an (optical) retardation device may be omitted, or this may be replaced with a purely electronic retardation of the intensity signals of the analyzer optics, if such a retardation is actually required.

The retardation device in the receiver is used to temporally retard the polarization-dependent intensity signals which have passed through a respective measurement region, or the partial beams, with different retardation times so that the pulsed partial beams which come from different measurement regions enter the analyzer optics, and strike the optical detectors present there, at different times. The retardation device generally allows the different retardation by generating a different optical path length of the respective partial beams to the analyzer optics. By the (optical) retardation device, the multiplicity of partial beams may be evaluated with the aid of a single analyzer optics.

By the different retardation, the spatial resolution by the different measurement regions may be transformed into a time resolution, or into a time-varying signal (time division multiplexing). In order to facilitate the assignment of the time-varying signals, or polarization parameters, generated by the respective pulsed partial beams, a trigger value may be generated, for example by using a fully absorbing measurement region or modulating one of the partial beams, in such a way that it allows unique assignment of the polarization-dependent intensity signals determined by the analyzer optics to the measurement region which is used for generating the trigger value, or trigger signal.

In one refinement, the beam splitter device comprises a diffractive optical element and/or at least one microlens array for generating the multiplicity of partial beams with equal wavelengths. In this embodiment, the laser beam is split at the diffractive optical element into a plurality of partial beams, which respectively have (approximately) the same wavelength. The spatially separated partial beams are subsequently retarded to different extents by means of at least one optical element of the retardation device, for example by means of a glass plate or a wedge plate.

In an alternative refinement, the beam splitter device comprises a diffractive optical element for generating a multiplicity of partial beams with different wavelengths, and the retardation device is preferably configured as a diffractive or dispersive optical element for retarding the partial beams having different wavelengths respectively with a different retardation time. In this case, the respective partial beams have a different wavelength and may be spatially split by means of a diffractive optical element, for example a reflection or transmission grating or a dispersive optical element, and temporally retarded to different extents by corresponding retardation sections, such as glass fiber cables of different length, for multiplexing.

In principle, the retardation device may also comprise refractive optical elements, or optical elements such as deflecting mirrors, wedge plates, prisms or the like, in order to retard the partial beams to different extents, typically before they enter the analyzer optics of the receiver. For the spatial superposition of the partial beams before entry into the analyzer optics, refractive optical elements having antireflection coatings may be provided with a wavelength-dependent reflectance or may comprise gradients in the antireflection coating, so that partial beams having different wavelengths are superposed.

The receiver generally comprises collimation optics for collimating the laser beam, or the partial beams of the laser beam, before entry into the analyzer optics. The analyzer optics which are used to determine the polarization-dependent intensities, i.e. intensities dependent on the polarization direction, (or equivalently thereto the respective power), may be configured in different ways. To this end, the analyzer optics comprise at least one detector, generally not a position-resolving detector, which may for example be configured in the form of a photodiode, for example a PIN diode. In order to determine two or more intensities in the case of different (linear) polarization directions, the analyzer optics may for example comprise a stationary polarizer and a polarization-rotating device, for example in the form of a rotating λ/2 retardation plate. However, the use of movable optical elements is disadvantageous for rapid evaluation with frequencies in the GHz range. It is therefore favorable for the analyzer optics not to comprise movable optical elements.

In one embodiment, the analyzer optics comprise a (geometrical) beam splitter for splitting a beam path of the analyzer optics into a first and second detection beam path. The geometrical beam splitter may, for example, be configured in the manner of a beam-splitter cube or the like, and it may be used to split the power of the laser beam into the two detection beam paths with a predetermined ratio in a fixed fashion (for example 50:50).

In one refinement, the first detection beam path comprises a first polarization beam splitter as well as a first and second optical detector, and the second detection beam path comprises a second polarization beam splitter as well as a third and fourth optical detector. The optical detectors, for example in the form of photodiodes, for example of (small) PIN diodes, allow sampling rates, or resolutions, of 10 GHz and more. The use of four detectors has been found favorable for determining the polarization parameters (Stokes parameters) of the field distribution from the polarization-dependent intensities, as will be described in more detail below. The optical detectors are adapted to the wavelength(s) of the laser beam, or of the partial beams. The optical detectors, or the PIN diodes, may be configured as free-beam diodes or as fiber-coupled diodes (single-mode or multimode). The latter have the advantage of being influenced less by stray light. The detectors used determine the maximum possible time resolution during the sampling.

In one refinement, the analyzer optics comprise a polarization-rotating device for rotating a polarization direction of the laser beam (or of the respective partial beams of the laser beam) by 45° either before the first polarization beam splitter or before the second polarization beam splitter. The polarization-rotating device may, for example, be a suitably orientated λ/2 retardation plate. In other to determine the polarization parameters, it has been found favorable for the four detectors to detect the power, or the intensity, respectively for two polarization directions orientated perpendicularly to one another (0° and 90° or 45° and 135°). The rotation of the polarization direction by 45° between the two detection beam paths simplifies the determination of the polarization parameters from the polarization-dependent intensities (see below). Apart from the polarization-rotating device, the two detection beam paths, or reflected and transmitted beam components of the laser beam in the analyzer optics are interchangeable.

In another refinement, an optical path length from the (geometrical) beam splitter of the analyzer optics to the first to fourth optical detectors is of equal size. It has been found favorable for the optical path length in the analyzer optics, or from the beam splitter to the detectors, to be of equal length so that no time-of-flight differences occur between the polarization-dependent intensity signals which are determined at the optical detectors. For the case in which only one laser beam is used, the optical path length not only in the analyzer optics but also from the focal plane to the four detectors is of equal size.

In another embodiment, the evaluation device is configured to form a sum signal and/or a difference signal from the determined polarization-dependent intensities of the first and second detectors and/or to form a further sum signal and/or a further difference signal from the determined polarization-dependent intensities of the third and fourth detectors. The evaluation device is configured to form a sum signal or a difference signal from the polarization-dependent intensities of the first and second and respectively the third and fourth detectors. From the sum of or the difference between respectively two intensities which have been determined in two orthogonally orientated polarization directions, the polarization parameters of the field distribution in the measurement region may be determined. The polarization parameters are generally two or more of the so-called Stokes parameters, although other parameters which describe the polarization state of the field distribution in the measurement region may in principle also be determined. With the aid of the sum and difference signals, the particle position, or the particle velocity, and the particle size may be determined simultaneously.

The formation of the sum or difference signals in the evaluation device may be carried out in readout electronics passively by means of directional couplers or actively by means of electronic amplifiers (operational amplifiers), in order to increase the signal-to-noise ratio and therefore the resolution of the sensor arrangement. The speed of the readout electronics is adapted to the bandwidth of the photodiodes. The readout electronics of the evaluation device are integrated into the receiver. The rest of the evaluation device may likewise be accommodated in the receiver, or in a housing of the receiver, although it is also possible for a part of the evaluation device to be connected to the receiver via an interface, for example if the calculations are carried out on an evaluation computer or the like.

In one refinement, the evaluation device is configured to calculate the particle size from the sum signal and/or from the further sum signal. Because of the relatively small measurement region and the high time resolution during the evaluation, it may be assumed for simplification that respectively only a single particle passes through the measurement region, i.e. the polarization-dependent intensities determined may be assigned uniquely to one particle. The sum signal of the polarization-dependent intensities which are determined at the first and second detectors is proportional to the total intensity of the laser beam which has passed through the measurement region (Stokes parameter $s_0$). The lower the total intensity or the sum signal is, the more greatly the measurement region is shadowed by the particle, i.e. the larger is the particle, or its cross section in the focal plane. The sum signal may be compared with one or more threshold values in order to classify the detected particles in their size. Optionally, to this end the readout electronics may comprise one or more electronic comparators, optionally with an adjustable threshold. With the aid of calibration, or delivery of particles having a known particle size to the measurement region, the size of the detected particles may be determined not only relatively but absolutely. The classification of the particles according to their particle size, or according to their particle cross section, may be carried out in a large size interval of, for example, about 100 nm-5000 nm.

In another refinement, the evaluation device is configured, with the aid of the difference signal and/or with the aid of the further difference signal, to calculate the particle position, the particle velocity and/or the particle acceleration in the focal plane, or in the measurement region. To this end, it is possible to evaluate the time evolution of a difference signal, generally the time evolution of both difference signals, which may be the two Stokes parameters $s_1$, $s_2$, which describe the linear components of the polarization. In addition, the sum signal, or the Stokes parameter $s_0$, may also be used for this purpose. Because of the correlation between the polarization distribution and the intensity distribution of the field distribution in the focal plane, it is possible to reconstruct the particle position in the measurement region and therefore, with the aid of the time evolution, the particle trajectory. To this end, a position in the measurement region may possibly be assigned beforehand to each Stokes vector $s_0$, $s_1$, $s_2$ and stored in a table. With the aid of the time evolution, or the variation, of the Stokes vector $s_0$, $s_1$, $s_2$, the velocity and the acceleration of a particle in the measurement region may also be determined.

As described above in connection with the calculation of the particle size, deviations of the particle trajectory from a setpoint trajectory may, for example, be detected with the aid of electronic comparators which compare the difference signals with optionally adjustable threshold values. For the case in which the deviations are too great, controlling or regulating intervention may optionally be carried out in a process in which the particles are generated, or the particle trajectory is predetermined. The setpoint trajectory may, in particular, be a predetermined constant setpoint position of the particle, at which the particle is intended to be held. By the time resolution in the GHz range, even very small deviations from such a setpoint position may be determined in real time.

With the aid of the emitter and the receiver, the particle position, the particle velocity, the particle acceleration and/or the particle size may be determined in two spatial directions in the focal plane. For the characterization in all three spatial directions of particles passing through the measurement region, the use of a single emitter and receiver pair is generally not sufficient.

In another embodiment, the sensor arrangement comprises a further emitter for focusing a further laser beam in a further focal plane, which intersects the focal plane in the measurement region, as well as a further receiver for receiving the further laser beam. The evaluation device is configured to determine a particle position, a particle velocity, a particle acceleration and/or a particle size in three spatial directions. The further emitter and the further receiver may in particular be configured with the same design as the emitter and receiver described above, and may be configured to determine the particle position, the particle velocity, the particle acceleration and/or the particle size in two spatial directions in the further focal plane. Since the further focal plane and the focal plane intersect in the measurement region through which the particles pass, all information in all three spatial directions for characterizing the particles passing through the measurement region is available to the evaluation device. It is favorable for the focal plane and the further focal plane to be orientated perpendicularly to one another.

In another embodiment, the emitter comprises a housing having an exit window and the receiver comprises a housing having an entry window, between which the focal plane is formed. The housings of the emitter and the receiver are hermetically sealed by windows from the particles and media to be examined. The projected measurement surface and the path curves of the particles are detected in the focal plane, which lies between the two hermetically closed housings.

In another embodiment, the emitter and the receiver, or more precisely their housings, are connected to one another in a fixed fashion. The emitter and the receiver may be connected to one another by a fixed, non-releasable connection; for example, the emitter and the receiver may be fastened to a C-frame. The fixed connection between the emitter and the receiver may also be configured to be releasable; for example, the emitter and the receiver may be connected to one another in a fixed fashion by a plug connection. The fixed connection ensures that the emitter and the receiver are arranged at a predetermined distance from one another and are orientated with respect to one another as desired, i.e. generally with entry and exit windows orientated parallel.

As an alternative, the emitter and the receiver of the sensor arrangement are not connected to one another in a fixed fashion. In this case, the emitter and the receiver are initially orientated with respect to one another and are stabilized in this orientation (passive embodiment). As an alternative, the emitter and the receiver are not connected to one another in a fixed fashion but an optical connection, or an orientation of the emitter and the receiver relative to one another, is maintained by means of active stabilization of the laser beam (active embodiment). In order to stabilize the laser beam, for example, the variation of the sum signal of all the detectors of the analyzer optics in combination with a sampling rate lower than the particle readout frequency may be used as a stability criterion. In this case, the sum signal is integrated over a period significantly longer than the particle readout frequency. Because of the longer integration time, the long-term drift between the emitter and the receiver, which results for example from a thermal drift between the emitter and the receiver, is visible in the sum signal. By a suitable displacement and/or rotation of the emitter and the receiver relative to one another as a function of the sum signal as a stability criterion, the optical connection, or the orientation between the emitter and the receiver, may be maintained. As an alternative or in addition, the signal of a camera (see below) may also be used as a stability criterion.

In another embodiment, the receiver comprises a further beam splitter for extracting a radiation component of the laser beam onto a position-resolving detector, in particular onto a camera. With the further beam splitter, any desired power fraction of the laser beam may be extracted onto a camera for process observation. The process observation may, inter alia, be used for initial orientation of the particles to be examined relative to the laser beam. The above-described active stabilization of the orientation of the emitter and the receiver may also be carried out with the aid of an output signal of the camera, this signal being used as a stability criterion. The camera may be integrated into the receiver. As an alternative, the receiver may comprise an extraction window, at which the extracted radiation fraction is extracted from the receiver in the direction of the camera.

A further aspect of the invention relates to an optical arrangement, in particular for an EUV radiation generation apparatus, comprising: a vacuum chamber, to which particles can be delivered, and a sensor arrangement, which is configured as described above, for characterizing, in particular for determining the particle position, the particle velocity, the particle acceleration and/or the particle size of the particles in the vacuum chamber. As described above, the sensor arrangement may be used in many application fields in order to characterize solid, liquid or gaseous particles, or particle flows.

For example, the sensor arrangement may be used for characterizing particles, or particle flows, in a vacuum chamber of an EUV radiation generation apparatus. Such an EUV radiation generation apparatus generally comprises a driver laser arrangement for generating a driver laser beam, as well as a beam delivering device for delivering the driver laser beam to the vacuum chamber described above. The driver laser beam is focused in a target region of the vacuum chamber, in which a target material in the form of tin particles or tin droplets is introduced. When irradiated by the driver laser beam, a respective particle enters a plasma state and then emits EUV radiation. The particles of the target material which are guided to the target region, as well as the particles which are generated upon impact of the laser beam on the target material (upon vaporization of the target material), may be characterized with the aid of the sensor arrangement described above. It is to be understood that the sensor arrangement may also be used for characterizing particles in other application fields, for example for characterizing soot particles, etc.

Further advantages of the invention may be found in the description and the drawings. Likewise, the features mentioned above and those referred to below may be used independently, or several of them may be used in any desired combinations. The embodiments shown and described are not to be interpreted as an exhaustive list, but rather have an exemplary nature for description of the invention.

In the following description of the drawings, identical references are used for components which are the same or functionally equivalent.

FIG. 1a schematically shows an example of a sensor arrangement 1, which comprises an emitter 2 for emitting a laser beam 3 and a receiver 4 for receiving the laser beam 3. The emitter 2 comprises a laser source 5 for generating the laser beam 3, which in the example shown, is a diode laser that has a laser wavelength, which, depending on the application, is selected from a wavelength range of between about 180 nm and about 10 000 nm. In the beam path of the laser beam 3, the laser source 5 is followed by collimation optics in the form of a collimation lens 6 for collimating the laser beam 3. The collimated laser beam 3 subsequently strikes a mode conversion device (mode converter) 7 and is focused by subsequent focusing optics in the form of a focusing lens 8 (having a focal length f) onto a focal plane 9, specifically onto a measurement region 10 which corresponds to the focal zone of the laser beam 3 in the focal plane 9.

The sensor arrangement 1 is used for characterizing particles P which pass through the measurement region 10, which is represented in FIG. 1a in a detail representation in the XY plane perpendicularly to the propagation direction Z of the laser beam 3. With the aid of the sensor arrangement 1, it is possible to determine a particle position $P_X$, $P_Y$, a particle velocity $v_X$, $v_Y$ and a particle size, or a particle diameter D, of particles P which pass through the measurement region 10.

Figure 4A:
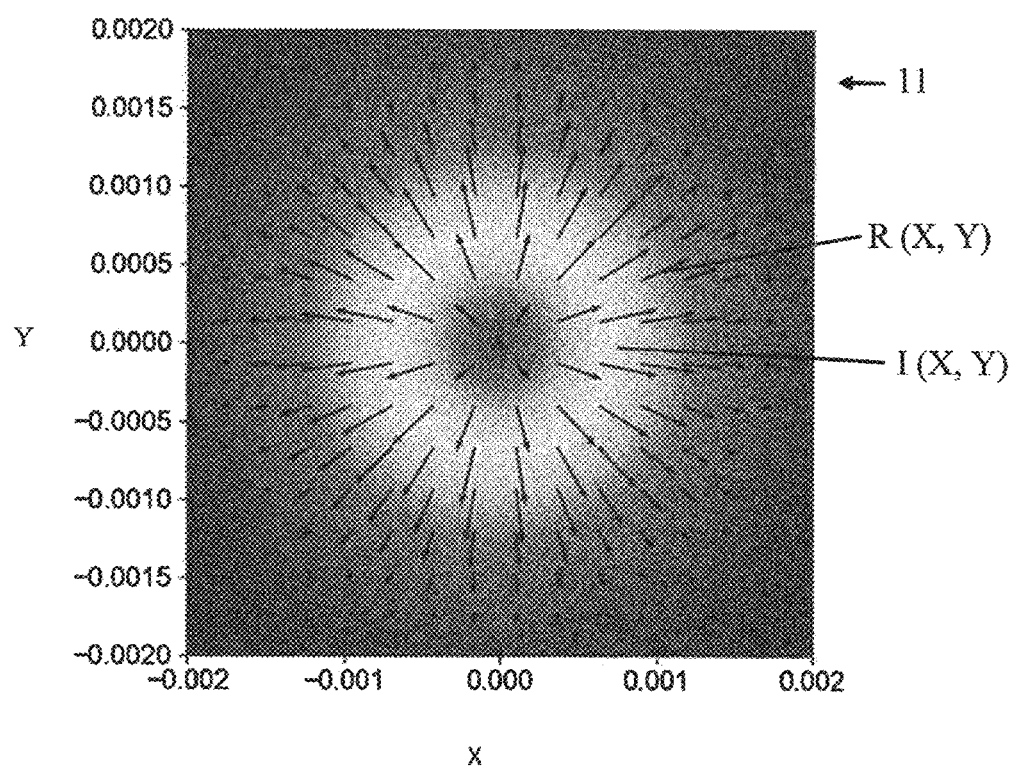
FIGS. 4a and 4b show a schematic representation of two field distributions, which are generated by a mode conversion device.

In order to make this possible, the mode conversion device 7, which in the example shown is configured as a segmented phase plate, and which may as an alternative be configured for example as a photonic crystal fiber, as a liquid crystal or as a diffractive optical element, generates a field distribution 11 as represented in FIG. 4a in the focal plane 9. The field distribution 11 generated by the mode conversion device 7 is radially symmetrically polarized, i.e. a local polarization direction R(X, Y) of the field distribution 11 is always orientated radially with respect to the center of the beam profile of the laser beam 3. The local intensity I(X, Y) of the laser beam 3 in the field distribution 11 forms a radially polarized mode. The field distribution 11 shown in FIG. 4a, which represents a superposition of a TEM01 and a TEM10 mode, is generated with the aid of the mode conversion device 7 from a TEM00 mode profile, which the laser beam 3 has when emerging from the laser source 5.

The field distribution 11 shown in FIG. 4a has the particular feature that it has a different combination of the local intensity I(X,Y) and the local polarization direction R(X,Y) at each position X, Y of the field distribution 11, and therefore of the measurement region 10, i.e. at no position X, Y do both the polarization direction R(X, Y) and the intensity I(X, Y) of the field distribution 11 correspond. This allows unique assignment of each position X, Y of the field distribution 11 to precisely one combination of intensity I(X, Y) and polarization direction R(X, Y).

Figure 4B:
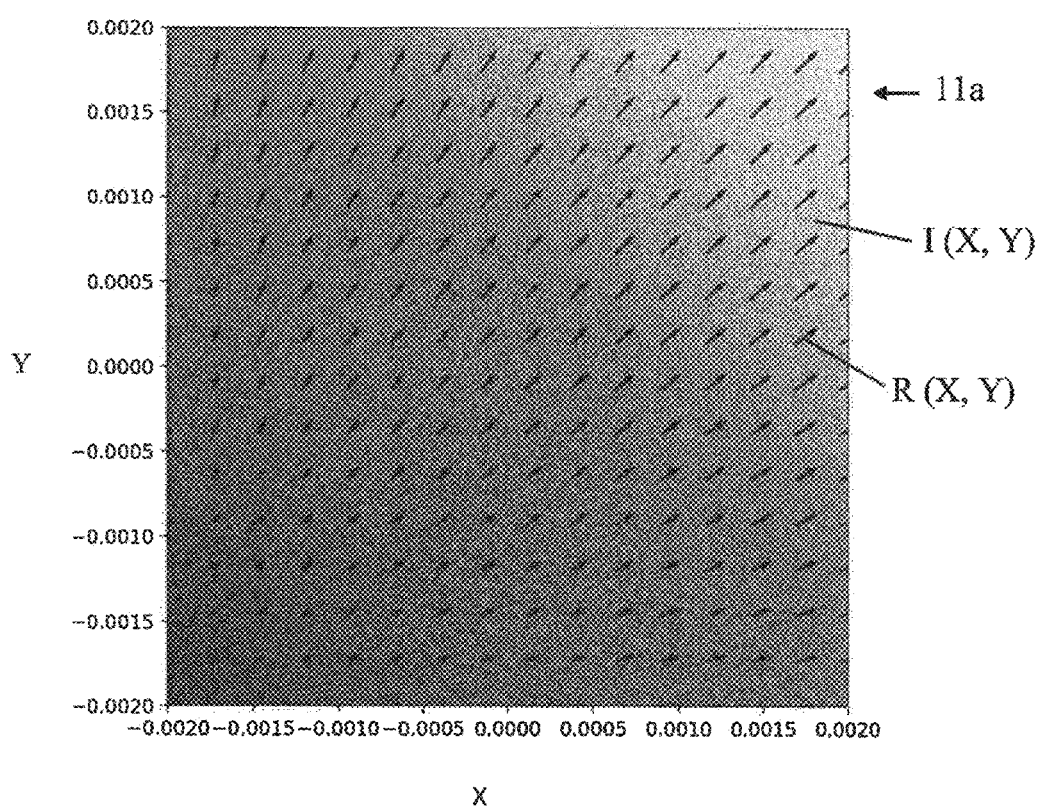

FIG. 4*b* shows a field distribution 11*a* which likewise has the property, described in connection with FIG. 4*a*, that each position X, Y can be uniquely assigned a polarization/intensity combination. In contrast to the field distribution 11 shown in FIG. 4*a*, the polarization direction R(X, Y) extends radially in the field distribution 11*a* shown in FIG. 4*b*. The intensity I(X,Y) increases continuously over the field distribution 11*a* along a defined direction.

The properties of the field distributions 11,11*a* shown in FIGS. 4*a,b* may be used to characterize the particles P in the manner described above, without having to carry out a position-resolved measurement. To this end, after passing through the measurement region 10, the laser beam 3 is first collimated by collimation optics, in the form of a collimation lens 12, arranged in the receiver 4. The collimated laser beam 3 enters analyzer optics 14 via a first geometrical beam splitter 13. At the first beam splitter 13, a radiation fraction of the laser beam 3, for example of about 50% of the radiation power, is extracted and does not enter the analyzer optics 14. The remaining 50% of the radiation power of the laser beam 3 strike a second geometrical beam splitter 15, at which the laser beam 3, or more precisely the radiation power thereof, is likewise split in a ratio of 50:50 between a first detection beam path 16*a* and a second detection beam path 16*b*.

In the first detection beam path 16*a*, the laser beam 3 transmitted by the second beam splitter 15 strikes a first polarization beam splitter 17*a*, which splits the laser beam 3 into two components linearly polarized perpendicularly to one another. The intensity $I_1$ of laser radiation with a polarization angle of 0° is in this case recorded by a first detector 18*a*, while the intensity $I_2$ of the laser radiation polarized perpendicularly thereto, i.e. with a polarization angle of 90°, is recorded by a second detector 18*b*. In the second detection beam path 16*b*, the laser beam 3 reflected by the second beam splitter 15 strikes a second polarization beam splitter 17*b*, but before this it passes through a polarization-rotating device in the form of a $\lambda/2$ retardation plate 19, which rotates the polarization state of the laser beam 3 by 45°. The intensity $I_3$ of the radiation fraction reflected at the second polarization beam splitter 17*b*, the polarization direction of which has a polarization angle of 45°, is detected by a third detector 18*c*. Correspondingly, the intensity $I_4$ of the radiation fraction transmitted by the second polarization beam splitter 17*b*, the polarization direction of which has a polarization angle of 135°, is recorded by the fourth detector 18*d*. With the aid of the four detectors 18*a-d*, four polarization-dependent intensity signals $I_1$ to $I_4$ are therefore recorded.

In the example shown, the optical detectors 18*a-d* are photodiodes, or more precisely PIN diodes, which allow sampling in the GHz range. In the example shown in FIG. 1*a*, the detectors 18*a-d* are embodied in the form of the PIN diodes as free-beam diodes. The analyzer optics 14 comprise focusing lenses for focusing the four linearly polarized fractions of the laser beam 3 onto a respective PIN diode 18*a-d*. As an alternative, the optical detectors 18*a-d* may, for example, be configured as fiber-coupled PIN diodes. The optical detectors 18*a-d* may be tuned to the wavelength of the laser beam 3, or optimized therefor. Such optimization is not absolutely necessary however, since conventional semiconductor detectors 18*a-d* consisting of Si, InGaAs or Ge cover the above-specified wavelength range well. The intensity signals $I_1$, $I_2$, $I_3$, $I_4$ are evaluated by means of an evaluation device (evaluator) 20 as described in more detail below.

In the example shown, the emitter 3 is screened from the surroundings by a housing 23. Correspondingly, the receiver 4 is also screened from the surroundings by a housing 24. For exit of the laser beam 3, an exit window 21*a* is formed on the housing 23 of the emitter 2. Correspondingly, an entry window 21*b* is formed on the housing 24 of the receiver 4 for entry of the laser beam 3 into the receiver 4 after passing through the measurement region 10. The receiver 4 comprises an extraction window 21*c*, through which a radiation fraction of the laser beam 3, which is transmitted by the first geometrical beam splitter 13, is extracted from the receiver 4 onto a position-resolving detector in the form of a camera 22. The camera 22 is used for process observation and may, for example, be used to identify, and optionally to correct, the orientation of the particles P, or of the particle flow, relative to the focal plane 9. The windows 21*a-c* make it possible to screen the emitter 2 and the receiver 4 from the surroundings, so that the sensor arrangement 1 may be used to detect different liquid, gaseous or solid media.

The emitter 2 and the receiver 4 are fastened to a frame 25 for orientation relative to one another. The frame 25 holds the emitter 2 and the receiver 4 at a constant distance and a constant angle orientation with respect to one another, and allows coaxial orientation of the optical axis of the emitter 2 and of the receiver 4. As an alternative to the example shown, it is possible to connect the emitter 2 and the receiver 4 releasably to one another, for example by means of a plug connection. It is likewise possible not to connect the emitter 2 and the receiver 4 to one another, but initially to orientate them with respect to one another (passive orientation) or orientate them relative to one another by means of active beam stabilization (active orientation). In the latter case, the orientation of the emitter 2 and the receiver 4 relative to one another is maintained with the aid of active laser beam stabilization. To this end, for example, the signal generated by the camera 22 may be used, which is used as a stability criterion for the orientation of the emitter 2 and of the receiver 4 relative to one another. The sum signal $I_1+I_2+I_3+I_4$ of all the detectors 18*a-d* may—given a sufficiently long integration time—also be used as a stability criterion.

For characterization of the particles P, a sum signal $I_1+I_2$ and a difference signal $I_1-I_2$, which respectively correspond to the Stokes parameter $s_0$ and the Stokes parameter $s_1$, are formed in the evaluation device 20 from the polarization-dependent intensities $I_1$, $I_2$ of the first and the second detector 18*a,b*. Correspondingly, a further sum signal $I_3+I_4$ and a further difference signal $I_3-I_4$ are formed from the polarization-dependent intensities $I_3$, $I_4$ determined at the third and fourth detectors 18*c,d*. The further difference signal $I_3-I_4$ in this case corresponds to the Stokes parameter $s_2$. The formation of the respective sum signal $I_1+I_2$, $I_3+I_4$ and the respective difference signals $I_1-I_2$, $I_3-I_4$ may be carried out in the evaluation device 20 with the aid of passive electronic components, for example with the aid of directional couplers, or with the aid of active components, for example with the aid of operational amplifiers. The speed of the readout electronics of the evaluation device 20 is adapted to the bandwidth of the detectors 18*a-d*.

The evaluation device 20 is configured to calculate the particle size D with the aid of the sum signal $s_0$ (or $I_1+I_2$). In this case, the fact that the sum signal $s_0$ is proportional to the total intensity of the laser beam 3 which has passed through the measurement region 10 is used. If the measurement region 10 is partially or possibly fully covered by a particle P, the total intensity of the laser beam 3 and therefore also the value of the sum signal $s_0$ is reduced. Correspondingly, the further sum signal $I_3+I_4$ may also be evaluated in order to calculate the particle size D. With the aid of the value of the sum signal $s_0$, the particles P may also be classified in their size, for example by comparing the value of the sum signal $s_0$, for example, with the aid of comparators having differently large threshold values, which are associated with a respective size class of the particles P.

The evaluation device 20 is also configured to determine the particle position $P_X$, $P_Y$ of the particle P in the focal plane 9 with the aid of the difference signal $s_1$ and with the aid of the further difference signal $s_2$. Optionally, the sum signal $s_0$ (or the further sum signal $I_3-I_4$) may additionally be used for this purpose. For the position determination, the evaluation device 20 may for example comprise a table or the like, which assigns a position $P_X$, $P_Y$ in the measurement region 10 to each combination $s_1$, $s_2$, or optionally to each combination $s_0$, $s_1$, $s_2$. With the aid of a time evolution of the difference signals $s_1$, $s_2$, it is possible to determine the trajectory of the particle P in the measurement region 10. With the aid of the time evolution of the difference signals $s_1$, $s_2$, it is furthermore also possible to determine a particle velocity $v_X$, $v_Y$ and a particle acceleration $a_X$, $a_Y$ at the respective particle position $P_X$, $P_Y$ in the focal plane 9.

Since sums or differences are calculated from the respective polarization-dependent intensity signals $I_1$, $I_2$, $I_3$, $I_4$ for the characterization of the particles P, it is necessary that a time offset, or a time-of-flight difference to the four detectors 18a-d, does not occur in the analyzer optics 14. In order to prevent this, the analyzer optics 14 are configured in such a way that the optical path length from the beam splitter 15, which splits the laser beam 3 between the first and second detection beam paths 16a,b, to the four detectors 18a-d is respectively of equal length.

Figure 1B:
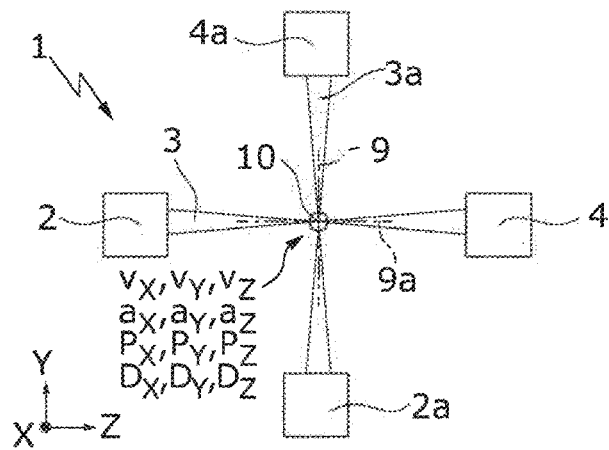
FIG. 1b shows a schematic representation of a sensor arrangement similar to FIG. 1a having a further emitter and a further receiver.

FIG. 1b shows a sensor arrangement 1 which comprises the emitter 2 and the receiver 4 of FIG. 1a, as well as a further emitter 2a and a further receiver 4a, which are of the same design as the emitter 2 and the receiver 4 of FIG. 1a. The further emitter 2a comprises a further focusing device for focusing a further laser beam 3a in a further focal plane 9a, which is orientated perpendicularly to the focal plane 9 of FIG. 1. The focal plane 9 and the further focal plane 9a intersect in the measurement region 10. Further evaluation optics of the further receiver 4a make it possible to determine the particle position $P_X$, $P_Z$, the particle velocity $v_X$, $v_z$ and the particle acceleration $a_X$, $a_Z$ of particles P in the further focal plane 9a. Since the two focal planes 9, 9a intersect in a linear section, extending in the X direction, of the measurement region 10, the evaluation device 20 may use the additional information in order to determine the particle position $P_X$, $P_Y$, $P_Z$, the particle velocity $v_X$, $v_Y$, $v_z$ and the particle acceleration $a_X$, $a_Y$, $a_Z$ of particles P, which pass through the measurement region 10, in all three spatial directions X, Y, Z. Correspondingly, the evaluation device 20 may also determine the particle size $D_X$, $D_Y$, $D_Z$ in all three spatial directions X, Y, Z.

Figure 2A:
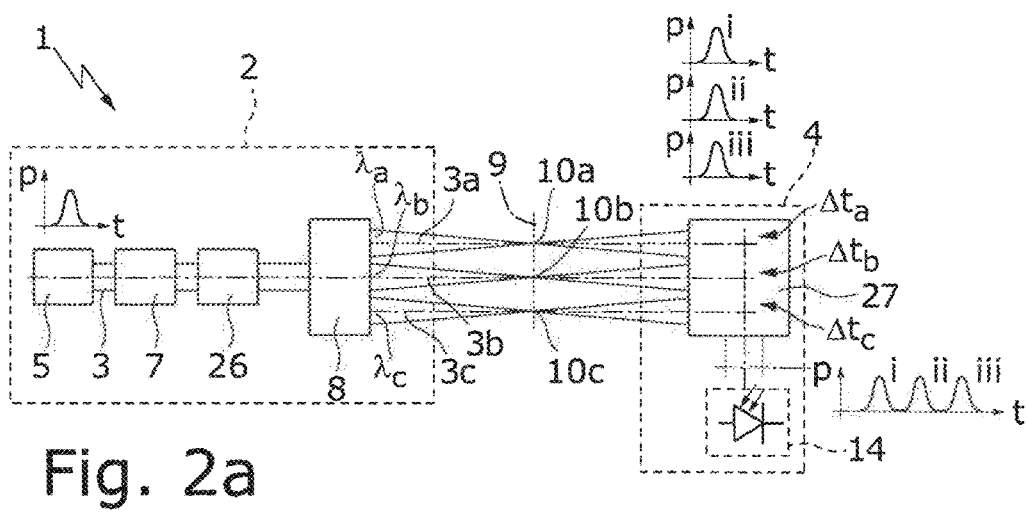
FIGS. 2a and 2b show schematic representations of a sensor arrangement which is configured to generate a multiplicity of measurement regions in the focal plane.

The sensor arrangements 1 shown in FIGS. 2a,b differ from the sensor arrangements 1 shown in FIG. 1a,b essentially in that instead of one measurement region 10, a multiplicity of measurement regions, of which three measurement regions 10a-c are represented by way of example, are generated in the focal plane 9. In order to generate the multiplicity of measurement regions 10a-c, a beam splitter device 26, which splits the laser beam 3 into a corresponding multiplicity of partial beams, of which three partial beams 3a-c are represented by way of example in FIGS. 2a,b, is arranged in the beam path after the mode conversion device 7. The three partial beams 3a-c are focused by the suitably modified focusing optics 3 into three measurement regions 8a-c, which are arranged at a distance from one another in the focal plane 9. In general, the measurement regions 8a-c, . . . are arranged in a regular arrangement (a measurement grid) in the focal plane 9. By the splitting of the laser beam 3 into a plurality of partial beams 3a-c, the region that can be monitored in the focal plane 9 with the aid of the sensor arrangement 1 can be enlarged significantly.

The laser source 5 of the sensor arrangements 1 shown in FIGS. 2a,b is operated in a pulsed fashion, i.e. it is configured to generate laser pulses, or a pulsed laser beam 3. The partial beams 3a-c generated at the beam splitter device, or beam splitter optics, which pass through the three measurement regions 10a-c, are therefore likewise pulsed when they enter the receiver 4. The receiver 4 comprises a retardation device 27 in order to retard the partial beams 3a-c with respectively different retardation times $\Delta t_a$, $\Delta t_b$, $\Delta t_c$, so that they enter the analyzer optics 14 with a time offset and the intensity signals $I_1$, $I_2$, $I_3$, $I_4$, which are assigned to different measurement regions 10a-c, strike the detectors 18a-d with a time offset. Time division multiplexing may be carried out in this way, so that the evaluation of the intensity signals $I_1$, $I_2$, $I_3$, $I_4$, which are assigned to different measurement regions 10a-c, may be carried out in chronological succession. Optionally, one of the partial beams 3a-c may be used as a trigger signal for the evaluation in the evaluation device 20, if the respective partial beam 3a-c generates uniquely identifiable (invariant) intensity signals $I_1$, $I_2$, $I_3$, $I_4$. This may, for example, be achieved if the respective partial beam 3a-c is obscured, for example by one of the measurement regions 10a-c substantially absorbing the corresponding partial beam 3a-c.

For the production of the beam splitter device 26 and the retardation device 27, there are different possibilities: in the example shown in FIG. 2a, the beam-splitter device 26 is configured as a diffractive optical element (diffraction grating) and is used to generate a multiplicity of partial beams 3a-c having different wavelengths $\lambda_a$, $\lambda_b$, $\lambda_c$. Correspondingly, the retardation device 27 is configured as a diffractive optical element, for example as a reflection or transmission grating, or as a dispersive optical element for retarding the partial beams 3a-c having different wavelengths $\lambda_a$, $\lambda_b$, $\lambda_c$, . . . with a respectively different retardation time $\Delta t_a$, $\Delta t_b$, $\Delta t_c$.

Figure 2B:
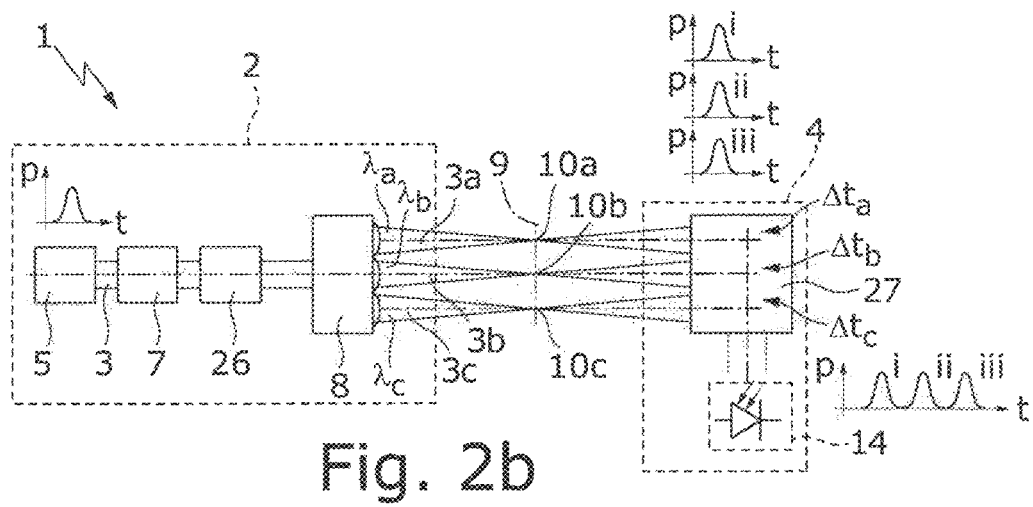

In the example shown in FIG. 2b, the beam-splitter device 26 comprises at least one microlens array for generating the multiplicity of partial beams 3a-c having equal wavelengths $\lambda_a$, $\lambda_b$, $\lambda_c$. In order to generate a grid-like arrangement of measurement regions 10a-c in the focal plane 9, the beam-splitter device 26 may, for example, comprise cylinder lens arrays. As an alternative or in addition to microlens arrays, a diffractive optical element which generates a plurality of partial beams 3a-c having substantially equal wavelengths $\lambda_a$, $\lambda_b$, $\lambda_c$ may also be used in the beam splitter device 26. The retardation device 27 in this case typically comprises at least one dispersive optical element, for example in the form of a glass plate or a wedge plate.

As indicated in FIG. 2b, the focusing optics 8 may in this case comprise a multiplicity of focusing lenses in order to focus the respective partial beams 3a-c onto the measurement regions 10a-c. In principle, the focusing optics 8 and the collimation optics 12, may comprise spherical, aspherical, achromatic lenses, crossed cylindrical lenses or (gradient index) GRIN lenses. It is to be understood that, as an alternative or in addition to transmissive optical elements, the focusing optics 8 and the collimation optics 12 may also comprise reflective optical elements.

The sensor arrangement 1 described in connection with FIGS. 1a,b and FIGS. 2a,b may be used to characterize particles P in many different applications. One such application will be described in more detail below with reference to an EUV radiation generation device 30 by way of example with the aid of FIG. 3. The EUV radiation generation device 30 comprises a beam source 31, an amplifier arrangement 32 having three optical amplifiers, or amplifier stages 33a-c, a beam guiding device 34, and a focusing device 35. The focusing device 35 is used to focus a driver laser beam 31a, generated by the beam source 31 and amplified by the amplifier arrangement 32, on a target region 36 in a vacuum chamber 38, in which particles P are introduced. The particles P, or an individual tin drop, are used as a target material and are irradiated by means of the driver laser beam 31a. The tin drop in this case enters a plasma state and emits EUV radiation, which is focused by means of a collector mirror 37. In the example shown in FIG. 3, the collector mirror 37 comprises an opening for the laser beam 31a to pass through. The beam source 31 comprises two $CO_2$ lasers in the example shown, in order to generate a pre-pulse and a main pulse, which together are amplified in the amplifier arrangement 32 and focused onto the target region 36. The beam source 31 forms together with the amplifier arrangement 32 a driver laser arrangement 39 of the EUV radiation generation device 30.

Figure 3:
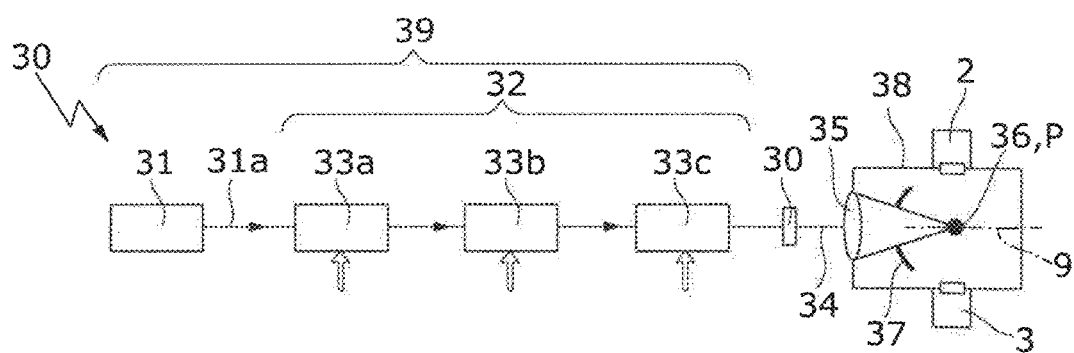
FIG. 3 shows a schematic representation of an EUV radiation generation apparatus, which comprises a sensor arrangement for characterizing particles in a vacuum chamber.

As may likewise be seen in FIG. 3, the emitter 2 and the receiver 4 of the sensor arrangement 1 are fitted on the vacuum chamber 38. The focal plane 9, in which the measurement region or regions 10, 10a-c are formed, extends through the target region 36 with the particles P in the form of tin droplets. With the aid of the sensor arrangement 1, it is possible to examine the particles P, or their movement to the target region 36, and to determine their movement, or trajectory. The size of the particles P, or the size of the smaller particles generated during vaporization of a respective tin droplet by the driver laser beam 31a, may also be determined with the aid of the sensor arrangement 1. The trajectories, or the velocity, of the particles P generated during the vaporization may also be detected by means of the sensor arrangement 1.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sensor arrangement for characterizing particles, including for determining a particle position, a particle velocity, a particle acceleration, or a particle size, the sensor arrangement comprising:
   an emitter, the emitter comprising:
      a laser source configured to generate a laser beam;
      a mode converter configured to generate a field distribution of the laser beam, which at each position has a different combination of a local intensity and a local polarization direction of the laser beam; and
      focusing optics configured to focus the field distribution of the laser beam onto at least one measurement region, through which the particles pass, in a focal plane; and
   a receiver, the receiver comprising:
      analyzer optics configured to determine polarization-dependent intensity signals of the field distribution of the laser beam in the at least one measurement region; and
      an evaluator configured to characterize the particles, for the characterizing comprising at least one of determining the particle position, the particle velocity, the particle acceleration, or the particle size, using the polarization-dependent intensity signals.

2. The sensor arrangement according to claim 1, wherein the mode converter is configured to generate the field distribution with a radially symmetrical polarization direction or to generate the field distribution with a linearly constant polarization direction.

3. The sensor arrangement according to claim 1, wherein the mode converter comprises a phase plate, as a diffractive optical element, as a photonic crystal fiber, or as a liquid crystal.

4. The sensor arrangement according to claim 1, wherein the laser source is configured to generate a pulsed laser beam.

5. The sensor arrangement according to claim 1,
   wherein the emitter comprises a beam splitter, arranged after the mode converter in the beam path, the beam splitter being configured to split the laser beam into a multiplicity of partial beams having the field distribution generated by the mode converter,
   wherein the focusing optics are configured to focus the multiplicity of partial beams into a multiplicity of measurement regions in the focal plane, and
   wherein the receiver comprises a retardation device configured to retard the multiplicity of partial beams respectively with a different retardation time.

6. The sensor arrangement according to claim 5, wherein the beam splitter comprises a diffractive optical element or at least one microlens array for generating the multiplicity of partial beams with equal wavelengths.

7. The sensor arrangement according to claim 5,
   wherein the beam splitter comprises a diffractive optical element for generating the multiplicity of partial beams with different wavelengths, and
   wherein the retardation device comprises a diffractive or dispersive optical element for retarding the partial beams having different wavelengths respectively with the different retardation time.

8. The sensor arrangement according to claim 1, wherein the analyzer optics comprise a beam splitter for splitting the beam path of the analyzer optics into a first and second detection beam path.

9. The sensor arrangement according to claim 8,
wherein the first detection beam path comprises a first polarization beam splitter, a first optical detector, and a second optical detector, and
wherein the second detection beam path comprises a second polarization beam splitter, a third optical detector, and a fourth optical detector.

10. The sensor arrangement according to claim 9, wherein the analyzer optics comprise a polarization-rotating device configured to rotate a polarization direction of the laser beam by 45° either before the first polarization beam splitter or before the second polarization beam splitter.

11. The sensor arrangement according to claim 9, wherein an optical path length from the beam splitter of the analyzer optics to the first to fourth optical detectors is of equal size.

12. The sensor arrangement according to claim 9, wherein the evaluator is configured to form a sum signal or a difference signal from the determined polarization-dependent intensities of the first detector and the second detector or to form a further sum signal or a further difference signal from the determined polarization-dependent intensities of the third detector and the fourth detector.

13. The sensor arrangement according to claim 12, wherein the evaluator is configured to calculate the particle size from the sum signal or from the further sum signal.

14. The sensor arrangement according to claim 12, wherein the evaluator is configured to calculate, using the difference signal or the further difference signal, the particle position, the particle velocity, or the particle acceleration in the focal plane.

15. The sensor arrangement according to claim 1, further comprising:
a further emitter configured to focus a further laser beam in a further focal plane, which intersects the focal plane in the measurement region; and
a further receiver configured to receive the further laser beam,
wherein the evaluator is configured to determine a particle position, a particle velocity, a particle acceleration or a particle size in three spatial directions.

16. The sensor arrangement according to claim 1 wherein the emitter comprises a housing having an exit window, and wherein the receiver comprises a housing having an entry window, between which the focal plane is formed.

17. The sensor arrangement according to claim 1, wherein the emitter and the receiver are connected to one another in a fixed fashion.

18. The sensor arrangement according to claim 1, wherein the emitter and the receiver are not connected to one another in a fixed fashion, an optical connection between the emitter and the receiver being maintained by active laser beam stabilization.

19. The sensor arrangement according to claim 1, wherein the receiver comprises a further beam splitter configured to extract a radiation component of the laser beam onto a position-resolving detector.

20. An optical arrangement for an extreme ultraviolet (EUV) radiation generation apparatus, the optical arrangement comprising:
a vacuum chamber, to which particles are deliverable in a target region, and the sensor arrangement according claim 1, which is configured to characterize the particles in the vacuum chamber.

* * * * *